United States Patent
Cha et al.

(10) Patent No.: US 11,383,805 B2
(45) Date of Patent: Jul. 12, 2022

(54) BUOYANCY GENERATOR FOR VEHICLE

(71) Applicants: Hyundai Motor Company, Seoul (KR); Kia Motors Corporation, Seoul (KR)

(72) Inventors: Dong Eun Cha, Hwaseong-si (KR); Jin Ho Hwang, Cheonan-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 50 days.

(21) Appl. No.: 17/010,042

(22) Filed: Sep. 2, 2020

(65) Prior Publication Data
US 2021/0245851 A1    Aug. 12, 2021

(30) Foreign Application Priority Data
Feb. 11, 2020  (KR) .................. 10-2020-0016103

(51) Int. Cl.
| | |
|---|---|
| *B63C 9/18* | (2006.01) |
| *B63C 9/20* | (2006.01) |
| *B63C 9/00* | (2006.01) |
| *B60R 21/00* | (2006.01) |

(52) U.S. Cl.
CPC .................. *B63C 9/18* (2013.01); *B63C 9/20* (2013.01); *B60R 2021/0016* (2013.01); *B63C 2009/0029* (2013.01)

(58) Field of Classification Search
CPC ...... B63C 2009/007; B63C 2009/0029; B63C 9/18; B63C 9/19; B60R 2021/0016
See application file for complete search history.

(56) References Cited

U.S. PATENT DOCUMENTS

| | | | | |
|---|---|---|---|---|
| 6,394,867 | B1 * | 5/2002 | Bianco | B63C 9/04 |
| | | | | 114/360 |
| 6,551,159 | B1 * | 4/2003 | Spinelli | B60R 21/00 |
| | | | | 441/80 |
| 6,951,493 | B1 * | 10/2005 | Lu | B63C 9/08 |
| | | | | 2/DIG. 3 |

FOREIGN PATENT DOCUMENTS

| | | |
|---|---|---|
| CN | 2610685 Y | 4/2004 |
| DE | 2141085 A1 | 2/1973 |
| DE | 19850187 A1 | 5/2000 |
| KR | 10-1182898 | 9/2012 |
| KR | 10-1680700 | 11/2016 |
| KR | 20-0483068 Y1 | 3/2017 |
| KR | 10-2019-0057195 | 5/2019 |
| KR | 10-2019-0131322 A | 11/2019 |
| KR | 10-2019-0141843 A | 12/2019 |
| WO | WO-2016191821 A1 * 12/2016 ............... B63C 9/15 |

* cited by examiner

*Primary Examiner* — Andrew Polay
(74) *Attorney, Agent, or Firm* — Morgan, Lewis & Bockius LLP

(57) ABSTRACT

A buoyancy generator for a vehicle may include a housing detachably mounted on a vehicle, a buoyancy generating unit mounted in the housing and including a tube configured to be inflated and deployed to an outside of the housing and a gas supply connected to the tube and configured to supply inflation gas to the tube during operation, and a handle unit provided in the housing and having a handle to be operated to deploy the tube so that the tube floats to a water surface due to buoyancy of the tube to allow an occupant gripping the handle to float to the water surface together with the tube.

18 Claims, 5 Drawing Sheets

BUOYANCY GENERATOR FOR VEHICLE

CROSS REFERENCE TO RELATED APPLICATION

The present application claims priority to Korean Patent Application No. 10-2020-0016103, filed Feb. 11, 2020, the entire contents of which is incorporated herein for all purposes by this reference.

BACKGROUND OF THE INVENTION

Field of the Invention

The present invention relates to a buoyancy generator for a vehicle which is detachably mounted in a vehicle such that as a vehicle sinks under water, it is separated from the vehicle and is operated by an occupant's simple manipulation to provide buoyancy by an inflating tube to cause the occupant to float to the water surface.

Description of Related Art

In the case of water transportation, various safety devices filled with gas are provided in preparation for safety accidents. For example, in the case of a ship, a lifejacket is provided, and if the occupant wears a lifejacket and falls into the water after boarding, even an inexperienced swimmer can float to the water surface.

However, when a vehicle falls in to a deep river, lake, or sea, it may be difficult to properly deal with an emergency, leading to a personal accident. It is extremely rare for an occupant in a vehicle to wear a life jacket and to have a life tube for emergency situations. Furthermore, after falling into the water, a vehicle sinks under the water by the weight of the vehicle body. Therefore, there is a risk that an inexperienced swimmer may not float to the water surface, resulting in injury or death.

The water rescue device may be made of a simple structure which may be floated underwater using the buoyancy of gases. However, conventional buoyancy generating devices have been developed for a water vehicle and there is no suitable buoyancy generating device configured for vehicles. There are many difficulties in applying, to vehicles, protective equipment, such as a lifejacket, for occupants of the vehicles.

Therefore, to prepare for frequent flooding and city flooding which may occur in future cities, a buoyancy generator for vehicles that can implement a function of a lifesaving tube in the event of flooding is considered.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a buoyancy generator for a vehicle which is mounted in a vehicle such that as a vehicle sinks under the water, it is separated from the vehicle and is operated by an occupant's simple manipulation to provide buoyancy by an inflating tube to cause the occupant to float to the water surface.

In various aspects of the present invention, there is provided a buoyancy generator for a vehicle, the buoyancy generator including: a housing detachably mounted on a vehicle; a buoyancy generating unit mounted in the housing and including a tube configured to be inflated and deployed to an outside of the housing and a gas supply connected to the tube and configured to supply inflation gas to the tube during operation thereof; and a handle unit provided in the housing and having a handle to be operated to deploy the tube so that the tube floats to the water due to buoyancy to allow an occupant gripping the handle to float to the water surface together with the tube.

An external force applied by the occupant to grip the handle unit may be transmitted to the gas supply, and the gas supply supplies the inflation gas to the tube so that the tube is deployed.

The handle unit may include a trigger that moves in a direction in which an external force is applied in a response that the occupant grips the handle unit, so that the gas supply is operated correspondingly.

The handle unit may include a deformable portion which is deformable in shape in a direction in which a pressure generated by the external force is applied thereto, and when the pressure applied to the trigger is transmitted to the deformable portion, a volume of the deformable portion is reduced, and the gas supply is operated in a response to reception of a pressure corresponding to the reduced volume of the deformable portion.

A pressure transfer element may be formed in the handle unit as a flow path fluidically-connected between the deformable portion and the gas supply and through which the pressure generated by the deformable portion is transferred to the gas supply.

The pressure transfer element may be formed from a micro tube having a narrow cross-sectional area, to transmit a force greater than the pressure, applied to the trigger, to the gas supply.

The deformable portion may be in a form of a corrugated pipe, wherein one end portion of the deformable portion is connected to the trigger and the other end portion to the pressure transfer element in a sealed manner, so that the pressure corresponding to the reduced volume of the deformable portion is transferred to the gas supply through the pressure transfer element.

The handle unit may include a closure provided at a point where the gas supply and the tube are connected, to be opened when receiving a pressure exceeding a threshold pressure to supply the inflation gas to the tube, wherein as the gas supply is operated to discharge the inflation gas, the closure is opened by the pressure of the inflation gas to be supplied to the tube through the closure.

The handle unit may be provided with a pressure transmission element provided on the gas supply in a sealed manner to transmit the pressure exerted by the external force to the gas supply to operate the gas supply, and wherein when the internal pressure of the gas supply exceeds the threshold pressure, the closure is open.

The buoyancy generator for a vehicle may further include a connection line detachably connected between the housing and a vehicle body such that the connection line is disconnected from the housing when the tube is deployed, wherein the connection line is connected to the handle unit such that the connection line is disconnected from the housing by the gripping pressure applied to the handle unit by the occupant.

The housing may be provided on an external surface thereof with a tear line to be torn upon inflation of the tube so that the tube is provided to penetrate through the housing and is deployed to the outside through the torn tear line.

The housing may be provided with a lighting module to visually recognize the position of the buoyancy generator mounted in an internal space of the vehicle, wherein the lighting module includes a battery supplying electric power, and the battery is charged via the connection line.

According to an exemplary embodiment of the present invention, the buoyancy generator for a vehicle mounted in a vehicle is configured such that as a vehicle sinks under the water, it is separated from the vehicle and is operated by an occupant's simple manipulation to provide buoyancy by an inflating tube to cause the occupant to float to the water surface, preventing a safety accident.

Furthermore, the structure of the buoyancy generator is configured to effectively transmit the pressure generated from the handle portion while the occupant grips the handle portion, and has a merit which may be applied to all vehicles due to its simple structure, easy manufacturing and use, and low manufacturing cost.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
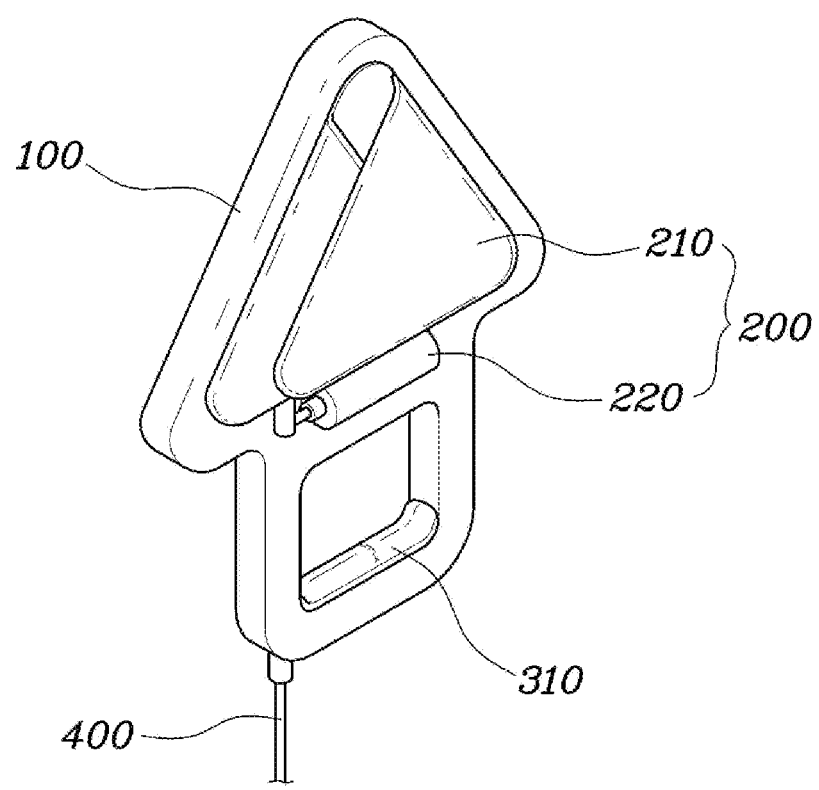
FIG. 1 is a perspective view exemplarily illustrating a buoyancy generator for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of the exemplary embodiments of the present invention included herein are merely exemplified for illustrating the exemplary embodiments according to an exemplary embodiment of the present invention, and the exemplary embodiments of the present invention may be implemented in various forms and may not be construed as limited to the exemplary embodiments described in the exemplary embodiment or application.

Since the exemplary embodiment according to an exemplary embodiment of the present invention may be diversely modified and may have various forms, specific embodiments will be illustrated in the drawings and described in detail in the exemplary embodiment or application. However, this is not intended to limit the exemplary embodiment according to the concept of the present invention to a specific disclosure form, and it may be understood that the exemplary embodiments include all modifications, equivalents, or substitutes within the spirit and scope of the present invention.

Terms such as first and/or second may be used to describe various components, but the components may not be limited by the terms. The above terms are only for distinguishing one component from another component. For example, the first component may be referred to as the second component, and similarly the second component may also be referred to as the first component, without departing from the scope of rights according to the concept of the present invention.

Hereinafter, the present invention will be described in detail by illustrating exemplary embodiments of the present invention with reference to the accompanying drawings in which the same reference numerals in each drawing denote the same members.

Various embodiments of the present invention relate to a buoyancy generator for a vehicle that provides buoyancy so that the occupant can float to the water surface when a vehicle sinks under the water. Unlike an existing lifesaving buoyancy device, it is the world's first one which is built in a vehicle to prevent a personal accident by assisting the occupant to escape when an inundation accident occurs.

FIG. 1 is a perspective view of a buoyancy generator for a vehicle according to an exemplary embodiment of the present invention. Referring to FIG. 1, the buoyancy generator for a vehicle may include a housing 100, a buoyancy generating unit 200, and a handle unit 300.

The housing 100 forms an external appearance of the buoyancy generator for a vehicle according to an exemplary embodiment of the present invention, and may be detachably mounted in a vehicle. The housing 100 may be mounted in an internal space of a vehicle or a vehicle body and then externally exposed for use by an occupant when an inundation accident occurs. The vehicle may include a rain sensor and the like for detecting flooding. If the housing 100 is formed to be exposed to the occupant in a normal state, there may be limitations to the use of the indoor space. Thus, the housing 100 may be configured such that the housing is stored in the vehicle in the normal state and if flooding is detected, the housing 100 is exposed for easy use by the occupant.

The buoyancy generating unit 200 is configured to generate buoyancy so that the occupant can float to the water surface by providing buoyancy underwater during operation. The buoyancy generating unit 200 may be mounted inside the housing 100. The buoyancy generating unit 200 may include a tube 210 and a gas supply 220.

The tube 210 is normally provided in a folded state in the housing 100, and when an inflation gas is supplied, the tube inflates outside the housing 100 to provide buoyancy. When the tube 210 inflates, a deployment portion such as a sewing line which may be easily torn may be formed on the outside of the housing 100 to tear and protrude out of the housing 100 to the outside.

The gas supply 220 is configured to store the inflation gas therein and supply the inflation gas to the tube 210 during operation. The inflation gas is stored in the gas supply 220 in a highly compressed state so that the tube 210 may be rapidly deployed. The gas supply 220 may be sealed so that the inflation gas does not leak, and one side thereof may be configured to be connected to the tube 210 to supply the inflation gas to the tube 210. When the volume decreases due to external force, the gas supply 220 may operate such that the internal pressure of the inflation gas increases to discharge the inflation gas into the tube 210.

The handle unit 300 is provided in the housing 100, and is configured to provide a handle so that the occupant float to the water surface. The handle unit is configured in an easy-to-grip form, so when an occupant grips the handle unit in the water, the occupant may float to the water surface due to buoyancy generated by the buoyancy generating unit 200. As illustrated in the figure, the handle unit 300 is preferably formed to have a hollow shape which is easy for the occupant to grip.

Figure 2:
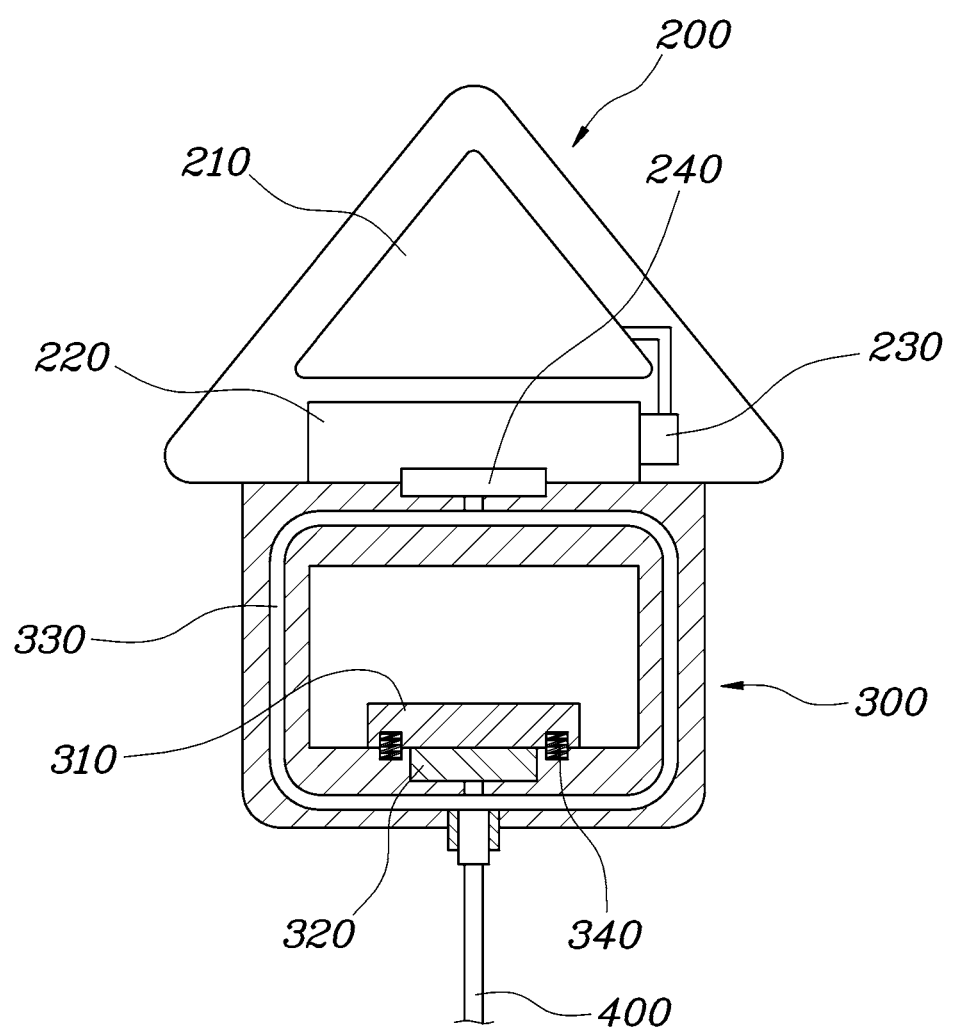
FIG. 2 is a view exemplarily illustrating the interior of the buoyancy generator for a vehicle according to an exemplary embodiment of the present invention.

FIG. 2 is a view exemplarily illustrating the interior of a buoyancy generator for a vehicle according to an exemplary embodiment of the present invention. Referring to FIG. 2, the handle unit 300 may include a trigger 310, a pressure transfer element 330, a deformable portion 320, and an elastic body 340, and the buoyancy generating unit 200 is provided with a pressure transmission element 240 and a closure 230.

The buoyancy generator may be operated by an occupant gripping the handle unit 300. When the occupant grips the handle unit 300, the gripping pressure may be transmitted to the gas supply 220. The gas supply 220 is operated by the gripping pressure to supply inflation gas to the tube 210, whereby the tube 210 may be deployed to generate buoyancy.

A trigger 310 may be provided on the handle unit 300, and an elastic body 340 may be formed on the trigger 310. The trigger 310 may be moved in the direction in which the occupant applies the pressure, for example, in the vertical direction as illustrated in FIG. 2. In a response to the movement of the trigger 310, the gas supply 220 may be operated correspondingly.

The handle unit 300 may further include a deformable portion 320. The deformable portion 320 may be deformed or moved in the direction under pressure.

In the case where the shape of the deformable portion 320 is deformed, when receiving the pressure applied to the trigger 310, the volume of the deformable portion 320 is reduced, and the pressure corresponding to the reduced volume is transferred to the gas supply 220. Upon receiving the pressure, the gas supply 220 may contract so that the pressure of the inflation gas increases, supplying the inflation gas to the tube 210.

Furthermore, the handle unit 300 may further include a pressure transfer element 330. The pressure transfer element 330 may be connected between the deformable portion 320 and the gas supply 220 to transfer the pressure generated by the deformable portion 320 to the gas supply 220.

The pressure transfer element 330 may be formed from a micro tube having a narrow cross-sectional area e.g., smaller than a predetermined diameter, to effectively transfer pressure. This is to provide a sufficient force to the gas supply 220 using the principle that in a case of constant pressure the force increases when the cross-sectional area of the fluid becomes narrow. The gas supply 220 contracts by a sufficient force to increase the pressure of the inflation gas, so that the inflation gas may be supplied to the tube 210. Therefore, even if a small force is applied to the trigger 310 in a situation where the occupant is in an urgent situation, the gas supply 220 may be easily operated, preventing safety accidents. The cross-sectional area of the micro tube may be formed at a degree sufficient to transmit a force while being smaller than the cross-sectional area of the handle unit 300.

The deformable portion 320 may be formed in a form of a corrugated pipe. One end portion of the deformable portion 320 may be connected to the trigger 310 and the other end portion to the pressure transfer element 330 in a sealed manner. That is, both end portions of the deformable portion 320 are sealed with respect to the trigger 310 and the pressure transfer element 330. Due to the sealed deformable portion 330, the displacement of the trigger 310 is fully reflected as the deformed amount of the deformable portion 320 so that the pressure applied to the trigger 310 may be supplied to the gas supply 220 through the pressure transfer element 330. Since the pressure is transmitted without loss, even if only a small pressure is applied by the occupant, the gas supply 220 is operated so that the buoyancy generator may be easily used in an emergency.

Also, the handle unit 300 may further include a closure 230. The closure 230 is provided at a point where the gas supply 220 and the tube 210 are connected. When receiving a pressure exceeding a certain threshold pressure, the closure is opened so that the inflation gas may be discharged to the tube 210. The closure 230 is a thin film that can be blown when the pressure exceeds the threshold pressure. When the gas supply 220 is operated to increase the pressure of the inflation gas, the discharge pressure of the inflation gas exceeds the threshold pressure of the closure 230 and the closure 230 is opened. The inflation gas is introduced into the tube 210 through the closure 230 so that the tube is deployed, providing buoyancy to the occupant.

Furthermore, the handle unit 300 may further include a pressure transmission element 240. The pressure transmission element 240 may perform a function of transferring the pressure, exerted by the occupant to the handle unit 300, to the gas supply 220. The pressure transmission element 240 may be provided outside the gas supply 220 to seal the gas supply 220 in a normal situation. When the occupant grips the handle unit 300, the pressure exerted by the occupant is transmitted to the pressure transmission element 240. When receiving the pressure, the pressure transmission element 240 may compress the gas supply 220 from the outside thereof to increase the internal pressure, opening the closure 230 to supply the inflation gas to the tube 210. Alternatively, the pressure transmission element 240 is made of a flexible material, and connected to the gas supply 220 so that the pressure exerted by the occupant is introduced into the gas supply 220. When the pressure transmission element 240 is a flexible plastic material, it is deformed into the gas supply 220 by the pressure exerted by the occupant and increases the internal pressure of the gas supply 220. When the internal pressure of the gas supply 220 is increased by the pressure transmission element 240 and the internal pressure exceeds the threshold pressure of the closure 230, the closure 230 is opened to generate buoyancy.

Furthermore, the buoyancy generator may further include a connection line 400 which is connected to the vehicle body and is disconnected from the housing 100 when the tube 210 is deployed. Normally, the connection line 400 connects the housing 100 and the vehicle so that the buoyancy generator is not lost. However, when the flooding situation occurs, the connection line 400 is separated so that the occupant can use the buoyancy generator. If the buoyancy generator is provided in an exposed state, a malfunction may occur due to unintentional external force, which may cause a danger that the buoyancy generator is not operated in a necessary situation. Therefore, in a normal state, the connection line 400 may be mounted on the vehicle, and only in an emergency state, the connection line may be exposed to the occupant.

Furthermore, the connection line 400 may be configured to be connected to the handle unit 300 such that when the occupant grips the handle unit 300, the connection line is disconnected from the housing 100 due to the gripping pressure. Therefore, when the occupant grips the handle unit 300 in an emergency situation, the housing 100 is detached from the vehicle, so that the occupant can float to the water surface. The handle unit 300 and the connection line 400 may be structurally detachably connected to each other by a physical structure. For example, when the occupant grips the handle unit 300, a pin of the handle unit may move to unlock the connection line 400. Furthermore, the handle unit 300 and the connection line 400 may also be electrically connected to each other so that they may be connected to or disconnected from each other by electrical signals and a solenoid type locker.

Furthermore, a tear line may be provided on the external surface of the housing 100 so that the tube 210 inflates and is externally exposed therethrough. The tear line is easily torn when a certain level of force is applied from the inside, like a weak sewn line, so that the tube 210 is provided to penetrate through the torn line of the housing 100 and is easily deployed to the outside.

Furthermore, although not illustrated in the drawings, the housing 100 may further include a lighting module. The lighting module may include a lighting unit that provides a visual signal to the occupant by emitting light in a dark place. When the flooding accident occurs on a cloudy day or at night, there is a risk of finding a location where the buoyancy generator is mounted. Therefore, the lighting module has the advantage that the occupant can easily identify the location where the buoyancy generator is mounted, preventing a safety accident. Furthermore, the lighting module may be configured to emit light when the flooding situation is detected by being electrically connected to the above-mentioned sensors that detect the flooding situation. Accordingly, the buoyancy generator can emit light automatically during flooding situation so that the occupant can easily use the buoyancy generator.

The lighting module may be configured to be charged via the connection line 400. A battery for supplying power to the lighting module may be provided so that the battery is charged by being connected to the connection line 400.

Figure 3:
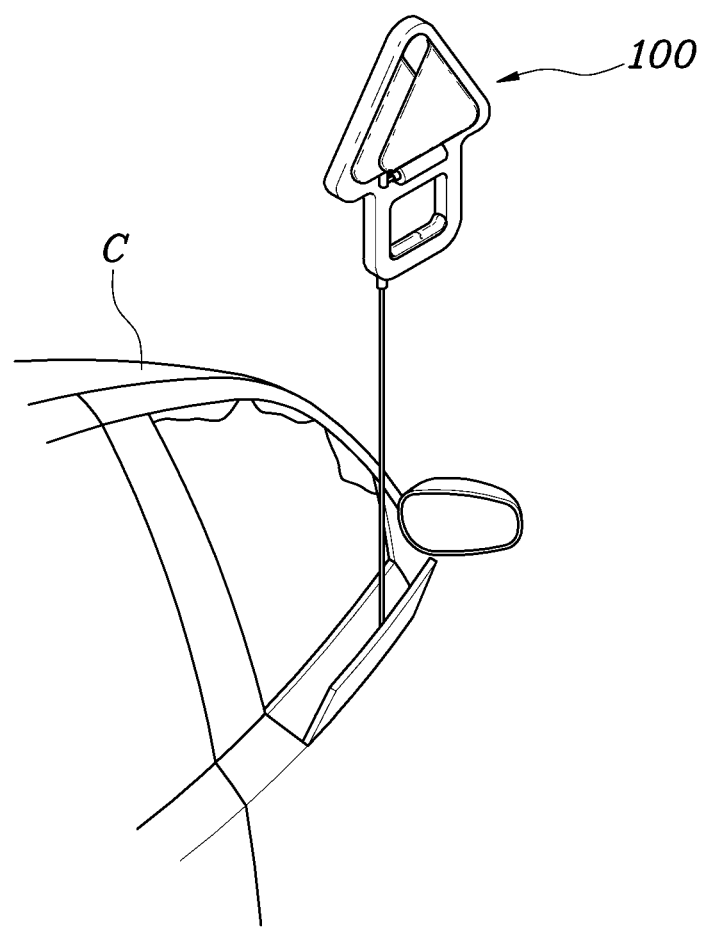
FIG. 3 is a view exemplarily illustrating the state of the buoyancy generator being exposed from a vehicle according to an exemplary embodiment of the present invention.
Figure 4:
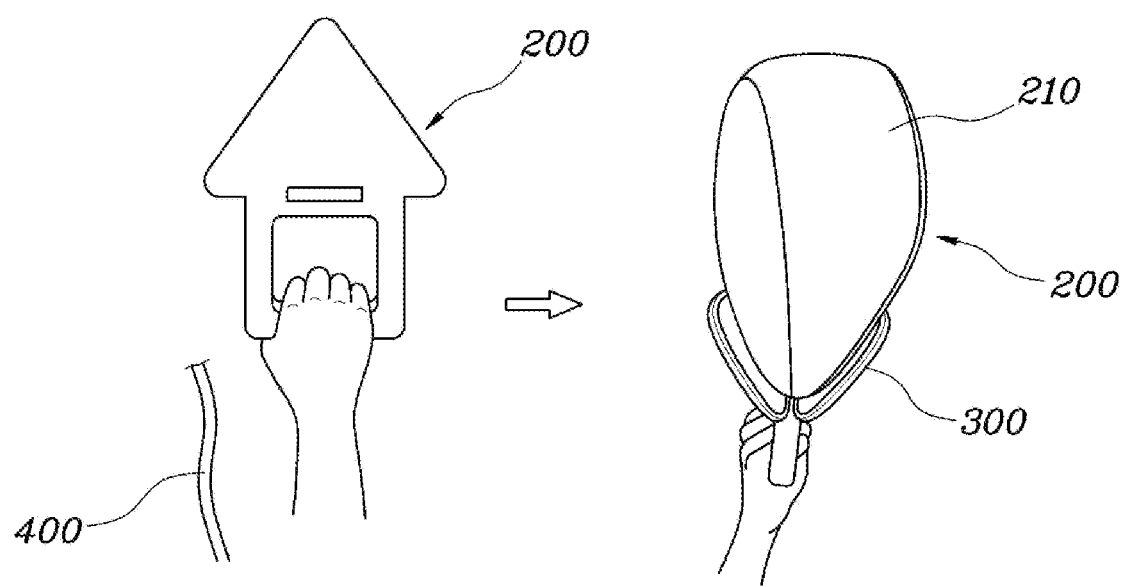
FIG. 4 is a view exemplarily illustrating the operation of the buoyancy generator for a vehicle according to an exemplary embodiment of the present invention.
Figure 5:
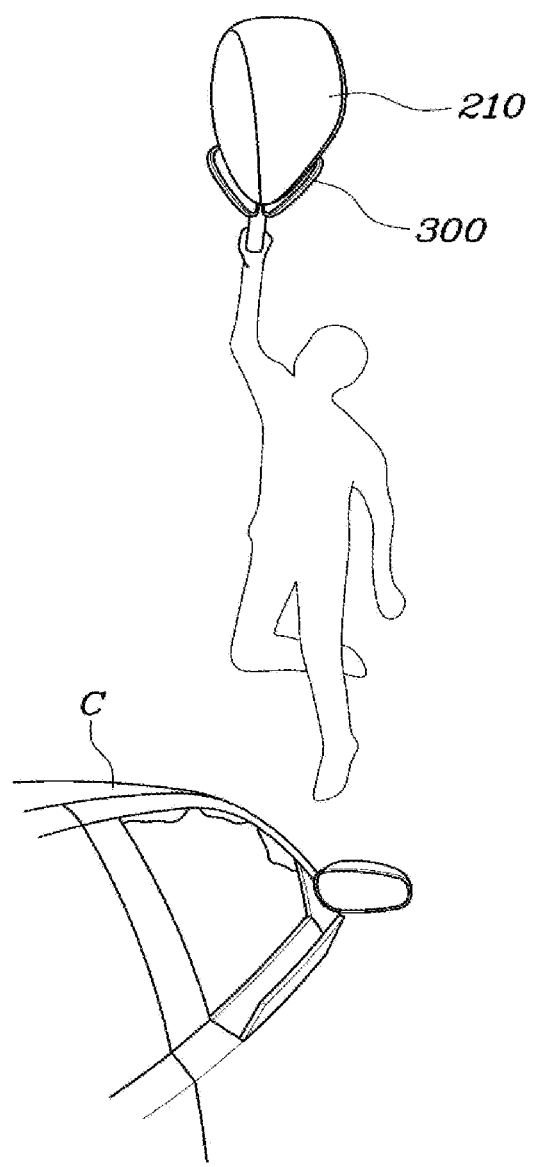
FIG. 5 is a view exemplarily illustrating the state of the buoyancy generator being utilized according to an exemplary embodiment of the present invention.

FIG. 3 is a view exemplarily illustrating the state of the buoyancy generator being exposed from a vehicle according to an exemplary embodiment of the present invention, FIG. 4 is a view exemplarily illustrating the operation of the buoyancy generator for a vehicle according to an exemplary embodiment of the present invention, and FIG. 5 is a view exemplarily illustrating the state of the buoyancy generator being utilized according to an exemplary embodiment of the present invention.

A situation in which the buoyancy generator is used will be described with reference to FIG. 3, FIG. 4, and FIG. 5.

As illustrated in FIG. 3, the buoyancy generator is normally mounted on a vehicle and exposed so that the occupant can easily use it when a vehicle sinks under the water. In the instant case, if the connection line 400 is provided, the buoyancy generator may be externally exposed with one end portion connected to the vehicle via the connection line 400.

Referring to FIG. 4, when the occupant grips the handle unit 300, the connection line 400 may be detached. As the connection line 400 is detached, the housing 100 is separated from the vehicle, and the buoyancy generating unit 200 is operated by the above-described mechanism, so that the tube 210 is deployed. When the inflation gas flows into the tube 210 and deploys the tube, buoyancy is generated. Therefore, as illustrated in FIG. 5, the occupant can float to the water surface with the tube 210 while gripping the handle unit 300. As a result, the personal accident may be prevented in the event of an inundation accident.

In an exemplary embodiment of the presently claimed invention, an end of the connection line 400 is detachably connected to the handle unit 300.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A buoyancy generator for a vehicle, the buoyancy generator comprising:
  a housing detachably mounted on a vehicle;
  a buoyancy generating unit mounted in the housing and including:
    a tube to be inflated and deployed to an outside of the housing; and
    a gas supply connected to the tube and configured to supply an inflation gas to the tube during operation thereof;
  a handle unit provided in the housing to be operated to deploy the tube so that the tube floats to a water surface due to buoyancy of the tube to allow an occupant gripping the handle unit to float to the water surface with the tube; and
  a connection line detachably connected between the housing and a vehicle body such that the connection line is disconnected from the housing when the tube is deployed.

2. The buoyancy generator for the vehicle according to claim 1, wherein when an external force is transmitted to the gas supply through the handle unit, the gas supply supplies the inflation gas to the tube and the tube is deployed.

3. The buoyancy generator for the vehicle according to claim 1, wherein the handle unit includes a trigger that moves in a direction in which an external force is applied and the external force is transferred to the gas supply to activate the gas supply, so that the gas supply is operated correspondingly.

4. The buoyancy generator for the vehicle according to claim 3,
wherein the handle unit includes a deformable portion which is deformable in shape by the trigger in a direction in which a pressure generated by the external force is applied thereto, and
wherein when the pressure applied to the trigger is transmitted to the deformable portion, a volume of the deformable portion is reduced, and the gas supply is operated in a response to reception of a pressure corresponding to the reduced volume of the deformable portion.

5. The buoyancy generator for the vehicle according to claim 4, wherein a pressure transfer element is formed in the handle unit as a flow path fluidically-connected between the deformable portion and the gas supply and through which the pressure generated by the deformable portion is transferred to the gas supply.

6. The buoyancy generator for the vehicle according to claim 5, wherein the pressure transfer element is formed of a micro tube having a cross-sectional area smaller than a predetermined diameter, to transmit a force greater than a pressure applied to the trigger, to the gas supply to activate the gas supply.

7. The buoyancy generator for the vehicle according to claim 5,
wherein the deformable portion is in a form of a corrugated pipe, and
wherein a first end portion of the deformable portion is connected to the trigger and a second end portion thereof is connected to the pressure transfer element in a sealed manner, so that the pressure corresponding to the reduced volume of the deformable portion is transferred to the gas supply through the pressure transfer element.

8. The buoyancy generator for the vehicle according to claim 1,
wherein the handle unit includes a closure provided at a point where the gas supply and the tube are connected, to be opened when receiving a pressure of the inflation gas greater than a threshold pressure to supply the inflation gas to the tube, and
wherein as the gas supply is operated to discharge the inflation gas, the closure is opened by the pressure of the inflation gas to be supplied to the tube through the closure.

9. The buoyancy generator for the vehicle according to claim 8,
wherein the handle unit is provided with a pressure transmission element provided on the gas supply in a sealed manner to transmit a pressure exerted by an external force applied to the handle unit to the gas supply to operate the gas supply, and
wherein when an internal pressure of the gas supply is greater than the threshold pressure, the closure is opened to supply the inflation gas to the tube.

10. The buoyancy generator for the vehicle according to claim 9,
wherein the handle unit includes a deformable portion which is deformable in shape in a direction in which the pressure generated by the external force is applied thereto, and
wherein a pressure transfer element is formed in the handle unit as a flow path fluidically-connected between the deformable portion and the pressure transfer element and through which a pressure generated by the deformable portion is transferred to the gas supply.

11. The buoyancy generator for the vehicle according to claim 10,
wherein the deformable portion is in a form of a corrugated pipe, and
wherein a first end portion of the deformable portion is connected to a trigger and a second end portion thereof is connected to the pressure transfer element in a sealed manner, so that a pressure corresponding to a reduced volume of the deformable portion is transferred to the gas supply through the pressure transfer element.

12. The buoyancy generator for the vehicle according to claim 1,
wherein the handle unit is provided with a pressure transmission element provided on the gas supply, and
wherein the pressure transmission element is made of a flexible material, and connected to the gas supply so that a pressure exerted by an external force applied to the handle unit is applied to the gas supply via the pressure transmission element.

13. The buoyancy generator for the vehicle according to claim 12,
wherein the handle unit includes a deformable portion which is deformable in shape in a direction in which the pressure generated by the external force is applied thereto, and
wherein a pressure transfer element is formed in the handle unit as a flow path fluidically-connected between the deformable portion and the pressure transfer element and through which a pressure generated by the deformable portion is transferred to the gas supply.

14. The buoyancy generator for the vehicle according to claim 13,
wherein the deformable portion is in a form of a corrugated pipe, and
wherein a first end portion of the deformable portion is connected to a trigger and a second end portion thereof is connected to the pressure transfer element in a sealed manner, so that a pressure corresponding to a reduced volume of the deformable portion is transferred to the gas supply through the pressure transfer element.

15. The buoyancy generator for the vehicle according to claim 1,
wherein the connection line is connected to the handle unit such that the connection line is disconnected from the housing by a gripping pressure applied to the handle unit.

16. The buoyancy generator for the vehicle according to claim 1,
wherein the housing is provided on an external surface thereof with a tear line to be torn upon inflation of the tube so that the tube is provided to penetrate through the housing and is deployed to the outside through the torn tear line.

17. The buoyancy generator for the vehicle according to claim 1, wherein the housing is provided with a lighting module to visually recognize a position of the buoyancy generator mounted in an internal space of the vehicle.

18. The buoyancy generator for the vehicle according to claim 17, further including:
- a connection line detachably connected between the housing and a vehicle body so that the connection line is disconnected from the housing when the tube is deployed,
- wherein the lighting module includes a battery supplying electric power, and the battery is charged via the connection line.

* * * * *